United States Patent [19]

Moreno

[11] Patent Number: 5,580,074
[45] Date of Patent: Dec. 3, 1996

[54] WHEEL SYSTEM FOR SOFT SURFACES

[76] Inventor: Peter Moreno, 2759 Rose Ave., Oxnard, Calif. 93030

[21] Appl. No.: 434,518

[22] Filed: May 4, 1995

[51] Int. Cl.⁶ .................................................. B62B 3/00
[52] U.S. Cl. .......................... 280/79.11; 152/5; 301/5.1; 301/5.3
[58] Field of Search ............................. 280/842, 843, 280/79.11, 47.331; 301/5.1, 5.3; 152/5, 7, 8

[56] References Cited

U.S. PATENT DOCUMENTS

| | | | |
|---|---|---|---|
| 1,777,698 | 10/1930 | Lofstrand | 280/843 X |
| 2,432,107 | 12/1947 | Williams | 301/5.1 X |
| 3,127,190 | 3/1964 | Thesmar | 280/79.11 |
| 3,197,223 | 7/1965 | Dickerson et al. | 301/5.1 X |
| 3,522,951 | 8/1970 | Tyson | 280/843 X |
| 4,066,272 | 1/1978 | Cobb | 280/79.11 |
| 4,127,281 | 11/1978 | Ferguson | 280/47.331 |
| 4,815,761 | 3/1989 | Henderson et al. | 280/47.331 X |
| 5,312,258 | 5/1994 | Giorgio | 280/843 X |

FOREIGN PATENT DOCUMENTS 1110060  6/1961  Germany ................................ 301/5.3

*Primary Examiner*—Kevin Hurley
*Assistant Examiner*—Michael Mar

[57] ABSTRACT

A platform or cart with a multitude of generally spherical rollers arrayed across most of the bottom of the cart so as to provide low resistance passage over soft or sandy surfaces. The rollers revolve about axles that are carried in flanges on the underside of the platform.

2 Claims, 1 Drawing Sheet

WHEEL SYSTEM FOR SOFT SURFACES

This invention was disclosed in Disclosure Document number 371,420, filed Mar. 6, 1995.

TECHNICAL FIELD

This invention relates to wheel arrangements for carts and other vehicles that are especially suitable for irregular and soft soils such as sand and mud.

BACKGROUND OF THE INVENTION

The classic prior art approach to designing wheeled carts and vehicles that operate on soft surfaces such as sand or mud is to use larger wheels or more wheels at the side of the cart. For the purposes of this application, the wheeled device is referred to as a cart, since that is the most ideal use of the invention. However, the inventive concept is equally applicable to any type of vehicle and the word cart should be understood to include all types of wheeled devices.

The prior art use of larger wheels requires that the wheels be located at the perimeter of the cart so that the load bearing surface of the cart can be kept reasonably close to the ground where it is accessible to convenient loading and unloading of whatever cargo is being carried on the cart. The larger, or more numerous, perimeter located wheels do allow travel over softer and more irregular surfaces, but it is still possible to encounter ground so soft and so irregular that the load bearing surface between the wheels will come to rest on the ground, stranding the wheels in the air without traction. This is especially true on sand surfaces, such as at the beach, where the wheels can continuously dig down until the load bearing surface bottoms out on the sand. Additional wheels, or more wheels, just adds to the expense and makes the cart more clumsy without really solving the problem. The present invention contemplates an entirely new approach that provides a cart that is impossible to bottom out in soft and irregular surfaces, while still being very low in cost, size, and weight.

STATEMENT OF THE INVENTION

Briefly, this invention proposes the use of an array of generally spherical rollers, distributed in close proximity to each other across the entire bottom surface of a load bearing platform. Numerous advantages flow from this array of rollers. Because a large number of rollers are used, each roller can have a small diameter which keeps the platform low, and easy to load, even though the rollers are under the platform rather than at the edges. With a large number of rollers, each roller carries a small fraction of the load. Thus, each roller may be lightly and inexpensively constructed of low cost plastics. Each roller can simply be pierced by an axle, totally eliminating the necessity of any special bearing structure. Prior art wheels usually incorporate some strengthening or friction lowering structure at the bearing point.

Even the destruction of one or two rollers is not debilitating because the large number of remaining rollers easily takes over the task of the non-functioning rollers allowing the cart to still function well.

Since there are rollers everywhere on the bottom surface of the cart, it is simply not possible for the cart to bottom out on a high piece of ground with the wheels held up clear of the ground. High pieces of ground never encounter the bottom of the load bearing platform, but rather always encounter one or more rollers.

The sphericity of the rollers insures that as the cart encounters very soft mud or sand, and begins to sink a bit, a great increase in roller surface area comes into contact with the soft ground so as to quickly increase the support area and prevent further sinking. The sphericity also makes turning the cart into a new direction very easy because the gently curved sides of the roller are easily moved sideways, up and over the soft surface. Hence, a load bearing platform with an array of closely positioned spherical rollers located everywhere on the bottom of the platform creates a cart or vehicle that can traverse any ground surface, in any direction, with low resistance and low effort. At the same time, such a cart is light, inexpensive, rugged, and durable. These advantages, and other advantages and benefits, will become apparent from the following detailed description and the drawings referenced thereby.

DETAILED DESCRIPTION OF THE INVENTION

Figure 1:
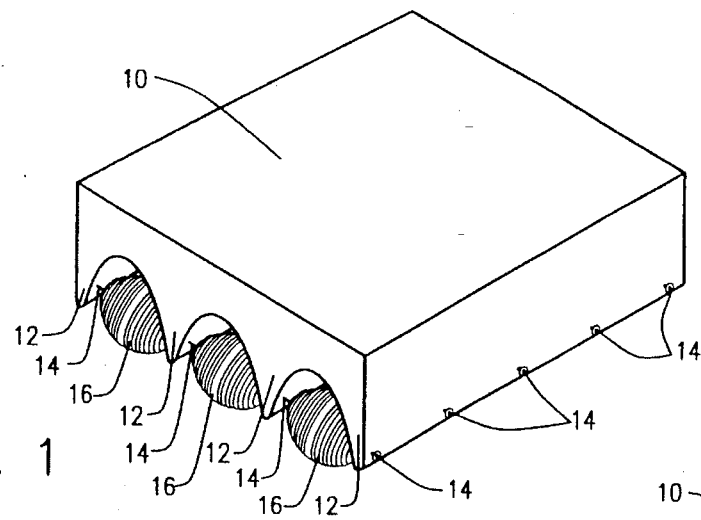
FIG. 1 is a perspective top view of a schematically represented load bearing platform or surface having an array of generally spherical rollers supported over the entire under surface thereof.

In FIG. 1, a load bearing platform or surface 10 is schematically indicated. Platform 10 may be simply flat, as shown, or have upwardly extending peripheral walls to help contain transported objects. Platform 10 could incorporate fastening devices to secure objects to the surface, if desired, or other attachment points to allow the cart to be towed or hand pulled. Platform 10 may be constructed of several parts connected together, or simply molded as a single piece, perhaps of plastic or metal. Further, load bearing surface 10 may be thought of as representing a portion of some other device that needs to travel over soft or irregular ground, such as a wheel barrow, wagon, sled, or the like.

Figure 2:
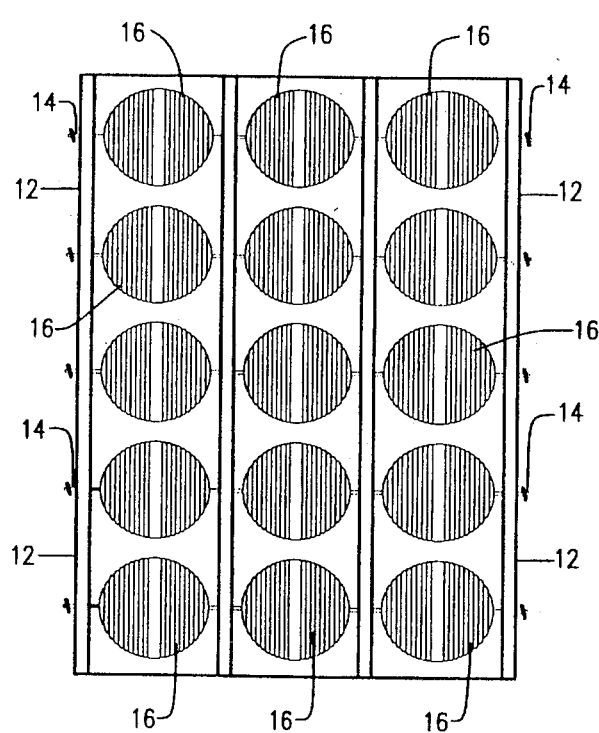
FIG. 2 is a bottom view of the load bearing platform to better show the rollers distributed thereon.

Surface 10 incorporates axle supporting means 12 that extend downward from the under side of surface 10. In the embodiment of FIGS. 1 and 2, the axle supporting means 12 comprise walls or flanges that run the length of surface 10 so as to simplify the molding of platform 10. A plurality of axles 14 are inserted through holes in flanges 12 so as to extend generally crossways to flanges 12. A plurality of generally spherical rollers 16, fifteen are shown in FIG. 2, are rotatably supported by axles 14. This results in an array of rollers intended to cover the entire under surface of platform 10. The separation of rollers 16 is slightly exaggerated in the drawings to enhance clarity, but in the actual embodiment, rollers 16 are situated as close to each other as practicable so as to present the maximum rolling surface to the ground at every location. This means that the rollers are nearly touching other rollers on adjacent axles and separated from other rollers on the same axle by just the thickness of flanges 12.

With such an array of closely spaced rollers, there is very little possibility of a high piece of ground reaching the bottom surface of platform 10 to block movement of the cart. Thus, the cart can be reliably and easily pulled or rolled over a soft or irregular surface, even when heavily loaded with cargo.

Figure 3:
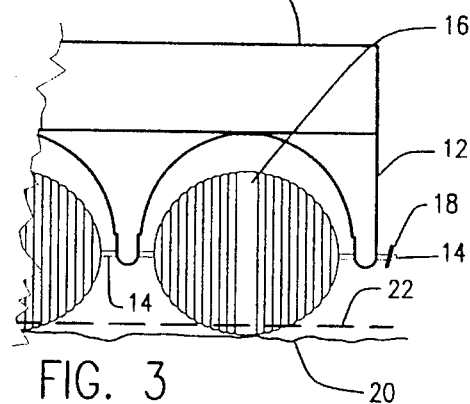
FIG. 3 is a fragmentary view of part of the platform to better analyze the details of one of the generally spherical rollers.

FIG. 3 shows one of the generally spherical rollers 16. In the preferred embodiment, roller 16 is contemplated to be a fairly thin walled, hollow, blow molded, plastic sphere like shape. Thus, it is very light, low in cost, and fairly rigid and strong, despite the thin walls, because of the sphere like shape. Axle 14 simply passes through small holes in the sides of the roller. No additional thickness or reinforcement is needed at the axle bearing point since the load of the cart is spread over so many rollers that the load on any one roller is small. The rollers could have thicker walls, or even be solid, for much greater strength, but this has been found to be unneeded in the preferred embodiment.

FIG. 3 shows that the axle 14 may be held in place by a small spring clip or nut 18 over the end of the axle just outside the last flange 12.

In FIG. 3, the ground level location for a relatively light load on platform 10 is represented by line 20. When the load is increased, the rollers begin to sink in a bit so that the ground line moves to the position shown by dashed line 22. As can be seen, the rounded shape of roller 16 causes a radical increase in the ground contact area of the roller as it moves down into the soft surface. Thus, the cart can not sink far because a great deal of reserve support surface quickly comes into effect to resist further sinking. The rounded shape also facilitates easier turning of the cart since the sides of the rollers easily slide up and over the soft surface of the ground during sideways movement.

Of course, for the purposes of this application, it is evident that the rollers 16 will work as well even if their shape is different from spherical provided that they remain well rounded. Thus, the descriptive term: "generally spherical" should be construed as including other non-spherical shapes as well, for example, any rounded roller that gradually decreases in diameter as it progresses away from the primary ground contacting area near the center toward the axle engaging portions at the side.

Figure 4:
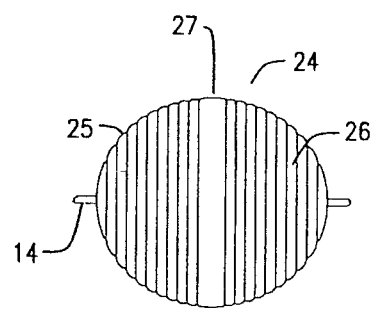
FIG. 4 shows another embodiment of a roller using a cylindrical ribbed center section to directionally stabilize the cart.

An example of a generally spherical roller, that is not totally spherical, is shown in FIG. 4. Here a roller 24 is shaped to have a pair of side hemispheres 25 and 26 spaced a bit by a cylindrical center section 27 that is ribbed circumferentially in line with the direction of rolling. Roller 24 has all the benefits described above with respect to spherical rollers, but also tends to keep the cart moving in a straight line in the natural direction of roll of the wheel. Also, the cylindrical center section increases the surface contact area so as to decrease wear when the cart is used on harder surfaces.

In addition to variations in roller shape, other modifications fall within the spirit and scope of the invention as well. Axles 14 need not extend the full width of the cart. The rollers may be arrayed in rows and columns, as shown in FIG. 2, or in some other pattern that allows close spacing. The axle support means 12 may comprise separate depending structures, rather than continuous flanges, as shown. Also, the platform underside may extend beyond the array of rollers to provide more carrying area. It is only necessary to provide an array of rollers over a majority of the platform area to achieve the benefits of the invention. Accordingly, limitation to the specific arrangements in the drawing is not intended, but rather the invention should be limited only by the appended claims and their equivalents.

I claim:

1. A wheeled cart comprising:

a load bearing platform having a substantially planar upper surface;

a plurality of longitudinally extending roller housings, each said roller housing extending parallel to an adjacent roller housing, and each said roller housing having an upper wall portion formed by a lower surface of said platform and laterally disposed sidewalls formed by longitudinally extending vertical flange portions depending downwardly from said upper wall portion, said upper wall portion being arch shaped in a direction extending transversely to a longitudinal direction of said roller housing;

a plurality of transversely extending axles spaced along the longitudinal length of said cart, each axle extending through openings formed in the flange portions of each of said roller housings; and a plurality of rollers disposed in longitudinal alignment within each roller housing, each roller including a cylindrical shaped central portion having a plurality of circumferentially extending ribs formed on an outer surface thereof, a pair of laterally disposed hemispherical shaped end portions, and a transverse opening formed in the cylindrical and hemispherical shaped portions of each roller for receiving an axle therethrough.

2. The wheeled cart of claim 1, in which the roller housings consist of three roller housings arranged in parallel alignment and the rollers consist of five rollers located within each roller housing.

* * * * *